Aug. 25, 1964     J. B. BLYTHE     3,145,686

BOAT BUMPER AND CONTAINER

Filed March 29, 1963

*INVENTOR.*
John B. Blythe
BY
ATTORNEY

United States Patent Office 3,145,686
Patented Aug. 25, 1964

3,145,686
BOAT BUMPER AND CONTAINER
John B. Blythe, 71 Richard St., Tenafly, N.J.
Filed Mar. 29, 1963, Ser. No. 269,108
1 Claim. (Cl. 114—219)

This invention relates in general to a boat bumper and more specifically to a boat bumper which is constructed and designed to function separately or simultaneously as a boat bumper and/or a container for storing fluids of various kinds therein.

Heretofore as in small boats, as for example outboard motorboats, cabin cruiser, rowboats, runabouts, day sailers and the like, it has been noted that much of the limited space in such small boats was utilized for storing such boating necessities as extra cans of gasoline, oil, water or other fluid or semi-fluid accessories. For this reason the quarters for the passengers riding in such boats were often cramped and rendered uncomfortable.

In accordance with this invention much of the space which was heretofore utilized for the storage of such gas, oil and other liquids or semi-fluid accessories can now be allocated to passenger space or for the storage of other type of gear with novel means provided for storing the liquid for fluid necessities normally stored in such space.

It is an object of this invention to provide means whereby such liquids as water, fuel or oil and other liquids or semi-fluid material can be safely carried over the sides of the boat so that more of the interior space can be utilized for other purposes, e.g. added passenger comfort or the like.

Another object of this invention is to provide for a novelly constructed combination boat bumper and container which is specifically arranged for storing liquids therein.

Still another object is to provide for a combination boat bumper and container having a readily detachable closure for permitting the filling and dispensing of the liquid contained therein and which is rendered fluid tight when attached.

A feature of this invention resides in the provision of a novelly constructed boat bumper that is relatively rugged in construction, pleasing in appearance, can be readily and economicaly manufactured, and which can be used as a container for retailing and/or storing therein a fluid content as for example oil, paint, cleaners, and the like.

Another feature of the invention resides in the provision that the inherent usefulness of the combined boat bumper and container is such that the retailing of the fluid or semi-fluid material therein will enhance the sale of such products.

Other features and advantages will be more readily apparent when considered in view of the drawings in which.

Figure 2:
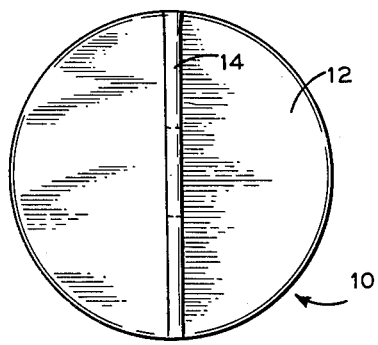
FIG. 2 is a left end view of the combined boat bumper and the container taken along line 2—2.
Figure 3:
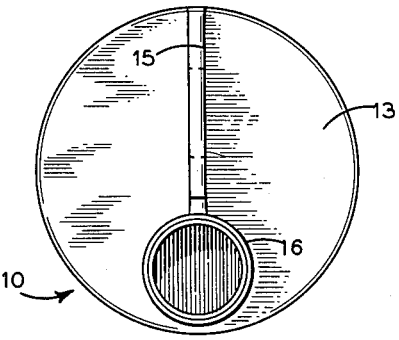
FIG. 3 is a right end view of the combined boat bumper and container taken along line 3—3 of FIG. 1.
Figure 1:
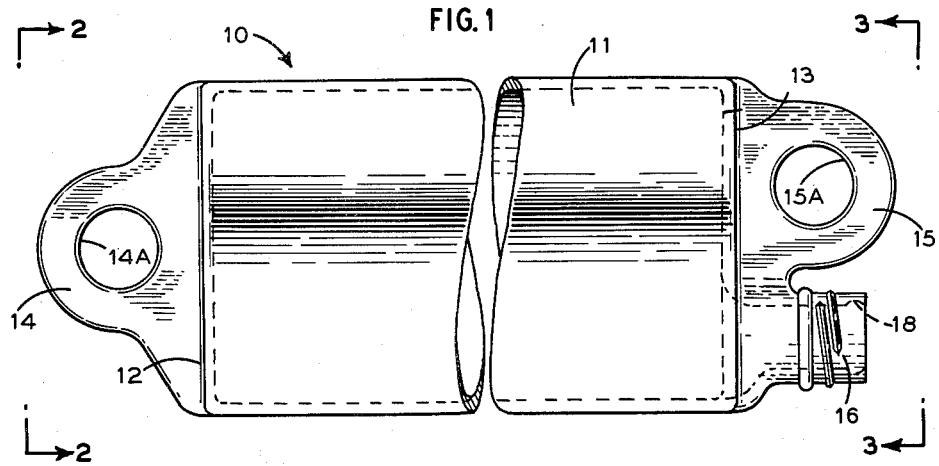
FIG. 1 is a side elevation view of the combined boat bumper and container, with portions broken away, in accordance with this invention.

Referring to the drawings, there is illustrated a novel combined boat bumper and container 10 of this invention. It comprises essentially an elongated hollow structure which is defined by an elongated tubular wall portion 11 which is closed at each end by end walls 12 and 13. In accordance with this invention it is contemplated that the combined boat bumper and container 10, as ilustrated in FIG. 1, be formed of a rugged plastic material and manufactured, as for example, by a blow molding method although it may be formed of any suitable material.

Integrally formed on each end wall 12 and 13 of the combined bumper and container 10 is a lug 14 and 15 respectively, each of which is disposed in the central axial plane of the container 10. As shown, each of the projecting lugs 14 and 15 is provided with an aperture or hole 14A, 15A respectively, through which a rope or other suitable line may be attached. A threaded nipple 16 is formed in end wall 13 of the combined bumper and container and defines a spout through which the liquid or fluid contents may be dispensed.

In accordance with this invention a removable cap 17 is threadedly connected to the nipple to form the closure therefor. The closure 17 is specifically constructed to define a fluid tight seal when threaded onto the spout. The fluid tight seal is provided by complementary means formed on the spout 16 and the closure 17 therefor.

Figure 5:
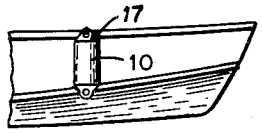
FIG. 5 is a fragmentary showing of a boat with the combined bumper and container illustrated in use as a bumper or fender guard.
Figure 4:
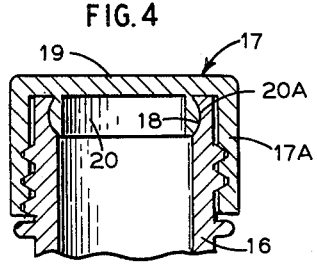
FIG. 4 is a detailed cross-section of the nipple defining a spout for the combined boat bumper and container by which the contents can be dispensed and closure therefor shown in fluid tight sealing relationship therewith.

The complementary means which define the fluid tight seal comprises an angular groove 18 formed along the interior wall of the spout 16 adjacent the upper end thereof. As shown in FIG. 4 the inner surface of the groove 18 has a concave cross-section. Connected to the top 19 of the cap 17 on the inside thereof and integrally formed therewith is a sealing ring 20 which is adapted to be received within the opening of the spout 16. As shown, the sealing ring 20 depends inwardly of the cap 17 and it is spaced inwardly of the circumscribing wall portion 17A of the cap 17. The outer wall surface 20A of the sealing ring 20 is formed to conform to the cross-sectional shape of the groove. Therefore, when the cap 17 is threaded down onto the spout 16, the sealing ring 20 is frictionally received within the mouth of the spout 16 so that the outer surface 20A of the sealing ring 20 defines a fluid tight seal with the groove 18. With this construction, it will be readily apparent that any liquid material, as for example emergency water supply, oil, fuel or the like, may be safely stored within the boat bumper, and the boat bumper 10 may be hung over the side of the boat as seen in FIG. 5. The boat bumper may therefore function as a bumper or fender to prevent damage to the boat when running into obstacles such as docks, piers and the like, and at the same time provide for storage of the liquid material exteriorly of the boat.

While FIG. 5 illustrates only one boat bumper of the instant invention hung over the side of the boat, it will be readily understood that a series of such boat bumpers may be circumferentially spaced about the entire periphery of the boat. Therefore, the amount of liquid or fluid which can be carried can be varied without utilizing any of the interior space of the boat itself. In addition, the boat is protected on all sides from damage to contact with obstacles such as docks or other boats and the like.

The combined boat bumper and container 10 is relatively simple in construction and attractive in appearance. The boat bumper may be formed of any durable and rugged material such as linear polyethylene which may be blow molded. As a result, the bumper may be produced inexpensively in mass quantities. The bumper, when used as a container, may carry various commodities relating both to nautical use or for a pool if desired, as for example, a pool float. Therefore, the combined boat bumper and container provided by the present invention is serviceable both for retailing fluids and for utilization as a boat fender or float.

While the instant invention has been disclosed with reference to a particular embodiment thereof it is to be appreciated that the invention is not to be taken as limited to all the details thereof as modifications and variations may be made without departing from the spirit of the invention or the scope of the appended claim.

I claim:

A boat bumper comprising (a) an elongated hollow container having closed end walls, said end walls being formed integral with the side wall, (b) a lug formed integral wtih at least one of said end walls, said lug having an aperture formed therein, and (c) said lug being formed along the central axial plane of said container, (d) one of said end walls having formed integral therewith an externaly threaded spout defining an opening for said container, (e) an internally threaded cap arranged to be threaded to said spout to define a closure therefor, and (f) complementary means formed integral on said spout and cap to form a fluid tight friction seal therebetween, (g) said complementary means including an annular groove having a concave surace and a cooperating annular bead having a convex surface adapted to be received in said groove to form a friction tight fluid seal between the cap and said spout.

References Cited in the file of this patent

UNITED STATES PATENTS

| | | |
|---|---|---|
| 254,265 | Bone | Feb. 28, 1882 |
| 1,361,902 | Porteous | Dec. 14, 1920 |
| 2,019,402 | Duffy | Oct. 29, 1935 |
| 2,197,839 | Roberts et al. | Apr. 30, 1940 |
| 2,541,928 | Loomis | Feb. 13, 1951 |
| 3,063,400 | Yamaguchi | Nov. 13, 1962 |